United States Patent
Harris et al.

[11] 3,931,851
[45] Jan. 13, 1976

[54] LIQUID AQUIFER ENERGY STORAGE METHOD

[75] Inventors: William B. Harris; Richard R. Davison, both of Bryan, Tex.

[73] Assignee: William D. Morse, Jr., Houston, Tex.; a part interest

[22] Filed: Feb. 1, 1974

[21] Appl. No.: 438,685

[52] U.S. Cl. ............ 165/2; 62/260; 165/18; 165/45; 166/263; 166/302; 237/1 A
[51] Int. Cl.[2] .......................... F24D 11/00
[58] Field of Search .......... 165/2, 45, 18; 126/271; 62/260; 166/52, 263, 302, 303; 237/1 A

[56] References Cited
UNITED STATES PATENTS

| | | | |
|---|---|---|---|
| 1,875,305 | 8/1932 | Hill | 165/45 |
| 2,007,406 | 7/1935 | Miller | 165/45 |
| 2,584,573 | 2/1952 | Gay | 165/45 |
| 2,637,531 | 5/1953 | Davidson | 165/45 |
| 2,693,939 | 11/1954 | Marchant | 165/18 |
| 2,780,415 | 2/1957 | Gay | 165/18 |
| 3,262,493 | 7/1966 | Hervey | 165/45 |
| 3,339,629 | 9/1967 | Hervey | 165/45 |
| 3,461,952 | 8/1969 | Decker | 165/45 |
| 3,620,206 | 11/1971 | Harris | 126/271 |

OTHER PUBLICATIONS

Environmental Science and Technology, June, 1973, pp. 512–516, Meyer and Todd.

*Primary Examiner*—Albert W. Davis, Jr.
*Assistant Examiner*—Daniel J. O'Connor
*Attorney, Agent, or Firm*—Fulbright & Jaworski

[57] ABSTRACT

A liquid aquifer energy storage method by which hot water is collected and stored in underground aquifers during the summer months and made available for heating during winter months. The liquid aquifer energy storage method also allows for the storage of cold water during the winter months for use in cooling during the summer months. The liquid aquifer energy storage method includes heating water and hot and warm zones within the aquifer or aquifers for storage of hot and warm water, respectively. Additionally, the method includes cooling water and cold and cool zones in the aquifer or aquifers for storage of cold and cool water.

14 Claims, 2 Drawing Figures

LIQUID AQUIFER ENERGY STORAGE METHOD

BACKGROUND OF THE INVENTION

The use of solar energy to help solve the world's present energy crisis is appealing. There is a large quantity of such energy which is available for use without any accompanying adverse environmental impact. However, solar energy is diffuse, i.e., it is spread over a wide area and the amount of energy available per square foot is not very large. Additionally, if the solar energy is to be used effectively, it must be received while the sun is shining and stored for use on cloudy days and at nighttime.

The storage of heat from solar energy has presented difficulties in the past. Various proposals have been advanced including hot water which is stored in insulated tanks, molten salts which deliver their heat of fusion while crystallizing, and basements full of hot rocks which are warmed during the day for use in warming the air during the night. The general idea has centered around the provision of storage sufficient for a daily or a weekly cycle to meet the needs for one house or building. However, storage in this manner has been found to be expensive. When heat is most needed, i.e., winter, the least amount of energy is received from the sun. The same type of situation exists with respect to cooling efforts. When cooling is most needed, i.e., summer, the least amount of sources for coolness is available.

In addition to single-building energy requirements, the need exists for a year-round solar heating and cooling system for use by a city, town or other large-scale energy consumer. Little attention has been directed to such large-scale needs, the satisfaction of which offers significant potential not heretofore appreciated.

Applicant presently is aware of existing patents in the field of the art, including U.S. Pat. No. 3,620,206 (Harris, et al., 1971); U.S. Pat. No. 3,339,629 (Hervey, 1967); U.S. Pat. No. 2,693,939 (Marchant, et al., 1954); U.S. Pat. No. 2,780,415 (Gay, 1957); U.S. Pat. No. 2,584,573 (Gay, 1952); U.S. Pat. No. 2,007,406 (Miller, 1935); U.S. Pat. No. 2,637,531 (Davidson, 1953); U.S. Pat. No. 3,262,493 (Hervey, 1966); and the reeferences cited therein. Applicant also is aware of the article by Charles F. Meyer and David K. Todd, entitled "Conserving Energy With Heat Storage Wells", in 7 *Environmental Science & Technology* 512 (1973).

SUMMARY OF THE INVENTION

The method of the present invention generally provides steps for collecting and storing hot and cold water in underground aquifers during summer and winter months, respectively, and making the same available for heating during winter months and cooling during summer months, respectively. The method includes heating or cooling water, passing the hot or cold water to an aquifer for storage, removing the hot or cold water from the aquifer as required, removing heat or cold from the water, and returing the warm or cool water to an aquifer.

The term "aquifer" is used herein in its commonly accepted sense, to-wit, a water-bearing bed or stratum of permeable rock, sand, or gravel capable of yielding considerable quantities of water to wells or springs.

It is, therefore, an object of the present invention to provide a liquid aquifer energy storage method for collecting and storing heat during the summer for use during the winter which includes heating water, passing the hot water to an aquifer for storage, removing the hot water from the aquifer as required, removing heat from the water, and returning the warm water to an aquifer.

Another object of the present invention is the provision of steps for partially reheating previously-used warm water prior to storage in the aquifer for warm water.

Still another object of the present invention is the provision of a liquid aquifer energy storage method for collecting and storing cold during the winter for use during the summer which includes cooling water, passing the cold water to an aquifer for storage, removing the cold water from the aquifer as required, removing cold from the water, and returning the cool water to an aquifer.

A further object of the present invention is the provision of a combined liquid aquifer energy storage method for collecting and storing heat and cold during the summer and winter, respectively, for use during the winter and summer, respectively.

Still other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

In the drawings forming a part of the disclosure herein, like character references designate like parts throughout the several views, wherein.

DESCRIPTION OF THE PREFERRED EMBODIMENT

The present invention provides a method which permits relatively low-cost heating and cooling storage on an annual basis, whereas prior efforts have been directed to the general concept of providing heating or cooling storage sufficient for a daily or weekly cycle to meet the needs of one house or building. In addition to providing heating or cooling storage on an annual basis, the efficiency of the present invention generally increases as the size of the project increases. Therefore, the present invention is directed toward use on a large-scale basis.

The present invention involves a method by which ambient energy collected from the sun or rejected to the atmosphere can be stored in large quantities and made available for heating and cooling when needed. This is accomplished by coupling a heat collection-rejection system with storage of the energy in the form of hot or cold water in an underground aquifer.

Hot water produced by a solar heater or cold water from a cooling pond is pumped into an underground porous formation. The hot or cold water which is pumped into the formation displaces any water which already exists in the formation until a large hot or cold zone is created. The first time this is done, a significant quantity of heat or cold will be used to change the temperature of the rock formation. In subsequent cycles, the amount of heat or cold lost to the heating or cooling of the surrounding core rock will be reduced significantly. In most instances, the operation of the system will require two zones in the water-bearing formations for both the heating and cooling portions of the system as will be discussed below.

Figure 1:
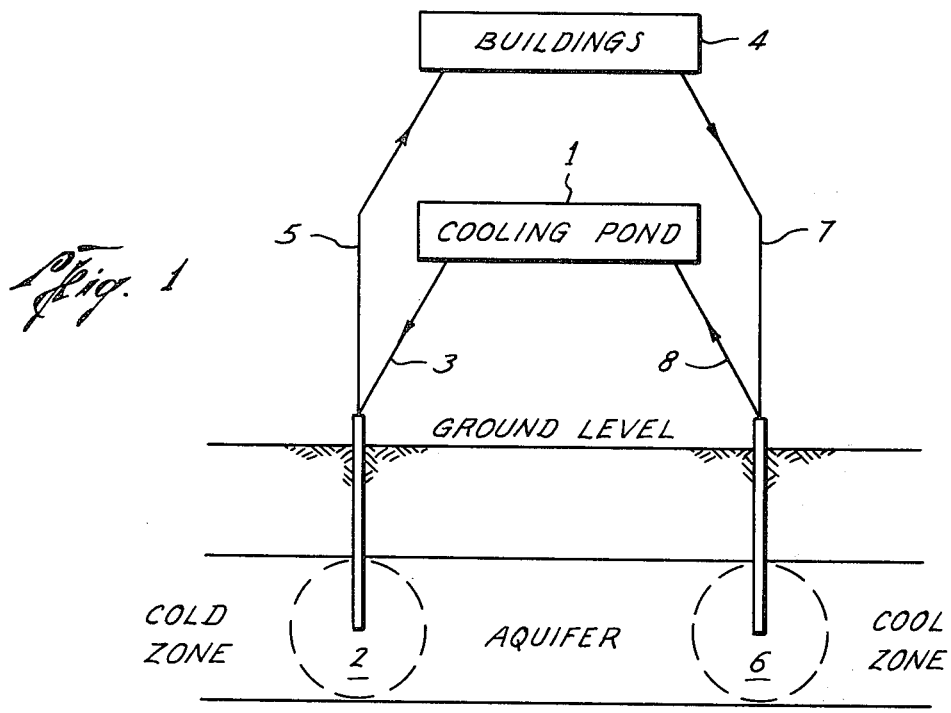
FIG. 1 is a schematic view of a liquid aquifer energy storage method for collecting and storing cold during the winter for use during the summer which shows one aquifer that includes portions for the storage of cold and cool water.

Referring to FIG. 1, the operation of the cooling cycle will be considered. During the winter season, cold water is produced in a cooling pond, spray pond, cooling tower, etc. 1, by contact with the cold air as well as by nocturnal radiation. As the cold water is produced, it is pumped into the cold zone 2 through a pipeline 3. In the summer, as cooling is required, the cold water is withdrawn and distributed to the houses and buildings 4 in pipelines 5, much as city water is presently delivered, except that the pipelines 5 are insulated for protection from heat gain. Within the buildings 4, the cold water flows through suitable heat exchangers (as may be selected by those skilled in the art) so that the building air is cooled and the water is warmed. If the water is warmed to a temperature which is still below the normal formation temperature, it may be delivered to the cool zone 6 for storage by means of pipelines 7. When the temperature of the water is being lowered during the winter, the water may be withdrawn from the cool zone 6, pumped to the chilling area, pond, etc. 1, by means of pipeline 8 and finally pumped into the cold zone 2.

In the present invention, no net amount of water is withdrawn from the formation except for that which is evaporated during winter cooling. Even if the water is salty, or otherwise contaminated, it may be used since all of the water is returned to the formation.

If the system is located near a large body of water, such as a lake, that reaches temperatures in the winter months which are below the temperature to which the water is to be lowered, the water may be removed from the body of water during the winter and stored in the underground cold zone 2 until summer. After being withdrawn and used for cooling, the water can be returned to the large body of water. Such procedure eliminates the need for a cool zone 6, reduces pumping requirements and eliminates the capital investment required for providing a cooling pond or similar equipment.

Figure 2:
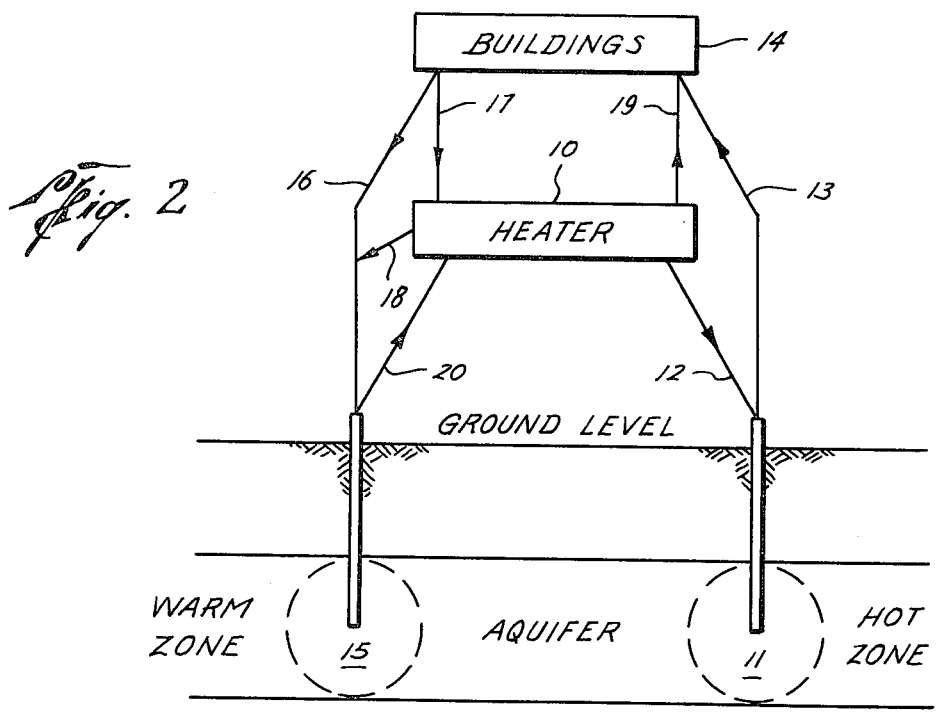
FIG. 2 is a schematic view of a liquid aquifer energy storage method for collecting and storing heat during the summer for use during the winter which shows one aquifer that includes portions for the storage of hot and warm water and indicates that the water may be partially reheated prior to storage in the warm water section.

The hot water system, as shown in FIG. 2, is similar in operation to the cold water system. The hot and cold water may be distributed to the houses and buildings by either the same or parallel water distribution systems.

During the summer, hot water is produced by a solar heater 10 and pumped into the hot zone 11 of an aquifer by means of a pipeline 12. It is withdrawn in the winter and circulated through pipes 13 to buildings and houses 14 in which it is sent through a suitable heat exchange device for heat exchange with air of the building or house 14 and the water itself is cooled. The resulting warm water is returned to the warm zone 15 by means of pipeline 16, or if solar conditions are good, the warm water may be sent to the heater 10 by means of pipeline 17 for partially reheating before being returned to the warm zone 15 by means of pipeline 18. On sunny days, the water might be sufficiently reheated to recycle directly by piping 19 to the buildings 14 rather than using stored hot water. During the summer, the water in the warm zone 15 is sent, by means of pipeline 20, to the heater 10 for reheating and then is pumped into the hot zone 11. As in the case of the cooling system, no net withdrawal of water results in the heating system except for that which may be evaporated during summer heating.

The importance of having two zones of stored water for both heating and cooling should be emphasized. First, considering the zones associated with the heating system, the warm water which is returned to the aquifer probably is hotter than normal aquifer water. Thus, when the water is withdrawn for reheating, only the heat actually used for space heating in buildings and the like must be replaced.

A second important reason for having two zones of water is the fact that the cyclic flow of water into and out of each zone assures that each zone is surrounded by a partially heated, or cooled, buffer zone. This cyclic flow of water exchanges heat with the rock as it flows inward and also as it flows outward so that, after the first cycle, there is no net heat loss to the rock in the inner volume. Finally, the existence of the buffer zone reduces heat loss from or to the inner volume.

As indicated previously, the present invention is intended to be used on a large-scale basis. As one increases the size of a heated body, the stored heat varies with the volume while the loss varies with the outer area. The former is proportional to the diameter cubed, while the latter is proportional to the diameter squared. Such would be an exact description if the volume and the surroundings were both of uniform temperatures and if the volume were spherical. However, temperature gradients may exist which reduce the amount of heat loss.

In effect, the invention can be a local utility, adaptable to new developments, townhouses, apartment complexes, or even large cities. Centralized distribution of hot and chilled water in underground pipes already is well established for college campuses and similar complexes. If only 5 gallons per minute (¾-inch pipeline) is delivered to each house, as much as 120,000 Btu per hour can be available for each house. This amount of heat is adequately sufficient for a very large home. On the other hand, 5 gallons per minute of cold water potentially can furnish 5 tons of refrigeration per hour.

The system does require a suitable aquifer for storage. However, geological indications are that such aquifers lie beneath most areas of the country.

In summary, the method of the present invention generally provides steps for collecting and storing hot and cold water in underground aquifers during summer and winter months, respectively, and making the same available for heating during winter months and cooling during summer months, respectively. The method includes heating or cooling water, passing the hot or cold water to an aquifer for storage, removing the hot or cold water from the aquifer as required, removing heat or cold from the water, and returning the warm or cool water to an aquifer.

The present invention, therefore, is well adapted to carry out the objects and attain the ends and advantages mentioned as well as others therein. While a presently preferred embodiment of the invention has been given for the purpose of disclosure, numerous changes may be made without departing from the spirit and scope of the invention as hereinafter claimed.

What is claimed is:

1. A liquid aquifer energy storage method for collecting and storing heat in the form of heated water during warm periods for use during cold periods including
   a. heating the water,
   b. passing the hot water to a first portion of an aquifer for storage of said water until needed,
   c. removing the hot water from the first portion of the aquifer as required,
   d. removing heat from the water, thereby rendering the water warm, and
   e. passing the warm water to a second portion of the aquifer.
2. The method of claim 1 wherein in step (e) the water is sent to a second aquifer for storage.
3. The method of claim 2 wherein prior to step (e) the warm water is partially reheated.
4. The method of claim 3 wherein the reheated water may be recycled directly to step (d).
5. The method of claim 2 wherein the water in step (a) is heated by a solar heater.
6. The method of claim 1 wherein prior to step (e) the warm water is partially reheated.
7. The method of claim 6 wherein the reheated water may be recycled directly to step (d).
8. The method of claim 1 wherein the water in step (a) is heated by a solar heater.
9. A liquid aquifer energy storage method for collecting and storing of cold during cool periods for use during warm periods including
   a. cooling the water,
   b. passing the cold water to an aquifer for storage of said water until needed,
   c. removing the cold water from the aquifer as required,
   d. removing cold from the water, thereby rendering the water cool, and
   e. returning the cool water to a second aquifer for storage.
10. A liquid aquifer energy storage method for collecting and storing of cold in the form of cold water during cool periods for use during warm periods including
    a. cooling the water,
    b. passing the cold water to a first portion of an aquifer for storage of said water until needed,
    c. removing the cold water from the aquifer as required,
    d. removing cold from the water, thereby rendering the water cool, and
    e. passing the cool water to a second portion of the aquifer.
11. A liquid aquifer energy storage method for collecting and storing of heat in the form of heated water during warm periods for use during cool periods and of cold in the form of cold water during cool periods for use during warm periods including
    a. heating the water,
    b. passing the hot water to a first aquifer for storage of said water until needed,
    c. removing the hot water from the aquifer as required,
    d. removing heat from the water, thereby rendering the water warm,
    e. passing the warm water to a second aquifer,
    f. cooling the water,
    g. passing the cold water to a third aquifer for storage of said water until needed,
    h. removing the cold water from the aquifer as required,
    i. removing cold from the water, thereby rendering the water cool, and
    j. passing the cool water to a fourth aquifer.
12. The invention of claim 11 wherein the first and second aquifers are combined, i.e., the hot water passing to a first portion of such aquifer for storage of said water while the warm water passes to a second portion of such aquifer for storage of said water, and wherein the third and fourth aquifers are combined, i.e., the cold water passing to a first portion of such aquifer for storage of said water while the cool water passes to a second portion of such aquifer for storage of said water.
13. The method of claim 12 wherein the water in step (a) is heated by a solar heater.
14. The method of claim 11 wherein the water in step (a) is heated by a solar heater.

* * * * *